Patented Apr. 15, 1941

2,238,579

UNITED STATES PATENT OFFICE 2,238,579

PROCESS OF PRODUCING TRANSPARENT ARTICLES

Charles A. Cabell, Washington, D. C., assignor to Economy Fuse & Manufacturing Company, Chicago, Ill., a corporation of New York No Drawing. Original application September 30, 1935, Serial No. 42,886. Divided and this application April 3, 1937, Serial No. 134,895

3 Claims. (Cl. 154—2)

This invention relates to a new and improved process of producing the novel composite articles set forth in applicant's copending application, Serial No. 42,886, filed September 30, 1935, of which this application is a division.

One of the objects of the present invention is to produce an article which is mechanically strong and which is resistant to the passage of an electric arc over its surface.

Another object of the present invention is to produce an article which is resistant to shock.

A further object within the purview of the present invention is to produce a composite article which is transparent and mechanically and electrically resistant.

Other objects, features, capabilities and advantages are comprehended by the invention, as will later appear and as are inherently possessed thereby.

A number of materials industrially available for the production of such articles have one or more of the desirable properties above enumerated but are so lacking in at least one of the properties as to render them non-usable.

Glass, for example, is transparent, mechanically strong, and non-tracking under an electric arc, but is somewhat brittle.

Phenolic materials are strong and non-hygroscopic but the ease with which conducting paths or tracks are formed upon the surface by the passage of even a low amperage arc therefore makes its use in electrical fuses extremely hazardous.

Now it has been found that a composite article which may be tubular or other shape, possesses all of the above enumerated desirable properties and may be made by combining glass and a cellulosic material such as regenerated cellulose. Such a regenerated cellulose is commercially available under the name of Cellophane in the form of relatively thin transparent sheets or strips.

In the copending application of Oscar A. Cherry and Charles A. Cabell, entitled "Transparent laminated product and process of preparing same," Serial No. 42,885, filed September 30, 1935, is described and claimed a method of producing a transparent, mechanically strong and shock-resistant tubular or sheet article. That process comprises winding a swollen sheet of Cellophane or similar cellulosic material upon a core or mandrel and drying the wound article while still on the mandrel. The contractile forces set up serve to produce a substantially homogeneous article.

Such an article is mechanically strong and is quite shock-resistant. However, it sometimes tracks upon the passage of an electric arc. Therefore, though useful in many applications, it is not in the highest degree suitable for all uses, such as for instance, for fuse casings.

It has now been found that when a glass tube is used as the mandrel for the wrapping of such a cellulosic article that the cellulosic product cannot be removed from the glass tube except by breaking the glass. The breaking of the glass is accomplished only with great difficulty since the cellulosic material adheres so tightly to the glass as to materially strengthen the glass. This phenomenon is probably allied to that which causes the breakage of so called laminated glass to be so difficult. After the glass has been cracked it is still difficult to remove the fragments and thus free the cellulosic article from its liner.

Therefore, in the construction of the composite article of this invention, moistened sheets or strips of thin, transparent cellulosic material such as Cellophane or similar material is wound onto a glass tube to form a cellulosic layer about $25/1000$ of an inch in thickness. After drying preferably at about 75 to 90 degrees C., another similar layer is wound on and dried. This process is continued until the required thickness is obtained.

After the final drying the product is cut to the exact length required and is then ready for use as a fuse casing, or for any other purpose wherein the above described properties are of importance.

As pointed out in said copending application above referred to, it is desirable to add to the water used for swelling the cellulosic material an adhesive such as gelatine in an amount corresponding to about 1½% of the weight of the water. If desired flame proofing salts may be added to the water for the purpose of rendering the cellulosic material non-inflammable.

When extreme shock resistance is required a shocking resistant glass such as Pyrex may be employed.

It is to be understood that a glass core of any desired shape may be used. If desired tubes of glass having various cross sectional shapes may be employed to make articles of various different shapes.

While I have herein described illustrative embodiments of the invention and a method or process of making same, it is to be understood that the invention is not limited thereto but may comprehend other constructions, arrangements of parts, details features and process steps without departing from the spirit of the invention.

I claim:

1. The method of producing a transparent reinforced glass tube which comprises placing an elongated, thin, transparent sheet of cellulose material capable of softening and swelling in water in contact with water until the same has become softened and swollen, thereupon applying said sheet while in a soft and swollen condition upon a glass tube in superimposed laminations tightly applied one upon the other to form a tube of such limited thickness as to preserve the transparency of the tube and then drying the tube so formed to cause the same to shrink upon and become permanently adhered to said glass tube, and thereafter applying additional layers of water softened and swollen transparent cellulose material by tightly winding a sheet of same on said previously formed and dried tube and again limiting the thickness thereof to preserve the transparency of the tube, and drying the additional laminations so applied.

2. The method of producing a transparent reinforced glass tube which comprises winding upon a glass tube a transparent sheet of water-softened and swollen cellulose material to form a tube having a plurality of superimposed laminations, but insufficient in number to materially impair the transparency of the tube when subsequently dried, drying, said cellulose material to cause the same to shrink upon and become permanently adhered to said glass tube, thereafter winding and drying on said tube another sheet of transparent cellulose material softened and swollen as aforesaid, and repeating said winding and drying operations with a sheet of said treated material until a tube of desired thickness is produced, the number of laminations of each application before drying being insufficient to materially impair the transparency of the resulting tube when dried.

3. The method of producing a transparent reinforced glass tube which comprises contacting a transparent sheet of cellulose material capable of softening and swelling in water with water containing an adhesive until the cellulose material has become softened and swollen, thereupon winding said sheet upon a glass tube to form a tube having a plurality of superimposed laminations but insufficient in number to materially impair the transparency of the tube when subsequently dried, drying said tube of cellulose material to cause the same to shrink upon and become permanently adhered to said glass tube, thereafter applying additional layers by winding on said tube another sheet of transparent cellulose material softened and swollen as aforesaid, said additional layers being insufficient in number to materially impair the transparency of the resulting tube, and then drying the additional layers.

CHARLES A. CABELL.